Jan. 10, 1950 W. G. DOW ET AL 2,493,950
HIGH-FREQUENCY INDUCTIVE WELDING APPARATUS
Filed Dec. 1, 1944 3 Sheets-Sheet 2

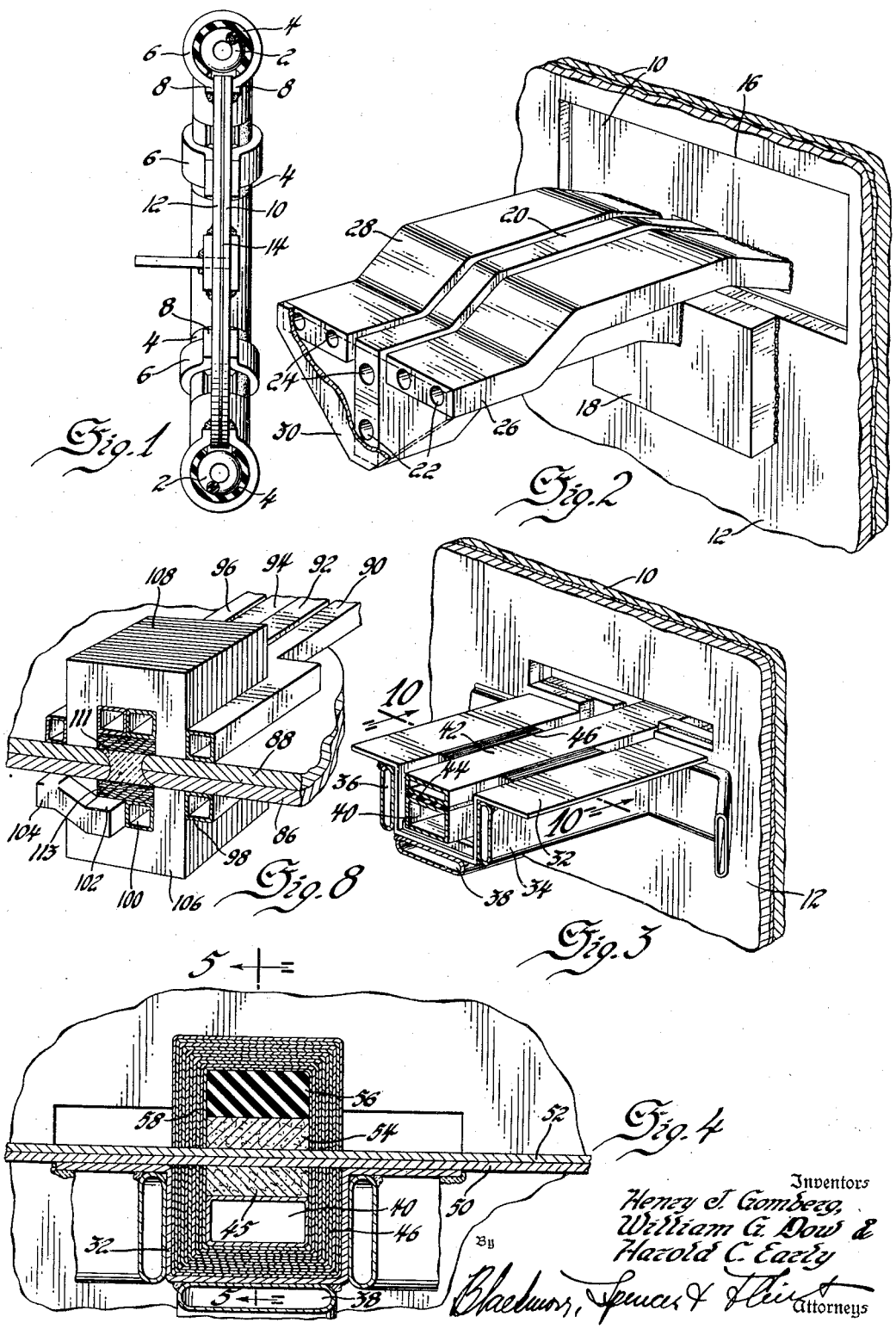

Inventors
Henry J. Gomberg,
William G. Dow &
Harold C. Early
By
Blackmore, Spencer & ...
Attorneys Patented Jan. 10, 1950

2,493,950

UNITED STATES PATENT OFFICE 2,493,950

HIGH-FREQUENCY INDUCTIVE WELDING APPARATUS

William G. Dow and Harold C. Early, Boston, Mass., and Henry J. Gomberg, Washington, D. C., assignors to General Motors Corporation, Detroit, Mich., a corporation of Delaware Application December 1, 1944, Serial No. 566,052

2 Claims. (Cl. 219—13)

This invention relates to means for securing members together in juxtaposition and more particularly to such means as is accomplished by high frequency induction welding.

In securing members together by welding, one of the problems involved is that of providing sufficient physical space or room adjacent the plurality of means conventionally necessary for applying the power as will enable the work to be readily and properly positioned. In other words, providing a sufficiently large "throat" so that the pieces to be welded can be satisfactorily applied to the electrodes or terminals.

It has been previously common to induce currents in metal bodies or sheets without actual conductive means, but these have been used largely for heating or heat treating and not for actually raising the temperature of the metal pieces above the fusion point for welding. If sufficient concentrated heat for fusion can be introduced by using induction methods, the question of a welding throat is removed inasmuch as the induction may be from one side of the sheets only.

It is therefore an object of our invention to provide a novel welding means utilizing high frequency currents for securing members together.

It is a further object of our invention to provide novel inductive means operating at high frequencies for welding members together.

It is a still further object of our invention to provide suitable inductor means for inducing high frequency currents into the work.

It is a still further object of our invention to provide inductors for inducing heating currents into the work and concentrating these currents to cause fusion of the metal.

With these and other objects in view which will become apparent as the specification proceeds, the embodiments of our invention will be best understood by reference to the following specification and claims and the illustrations in the accompanying drawings, in which:

Figure 1 is a vertical section taken through a high frequency transformer utilized for power for our system.

Figure 2 is a perspective view showing one form of inductors used for inducing electric currents into the work.

Figure 3 is a perspective view similar to Figure 2 showing a modified form of inductive means.

Figure 4 is a transverse vertical sectional view through inductive means similar to that of Figure 3, and showing in addition, parts applied to the upper surface of the work sheets.

Figure 8 is a partial perspective view parts being broken away and shown in section revealing a still further modified form of induction means embodying our invention.

Figure 5:
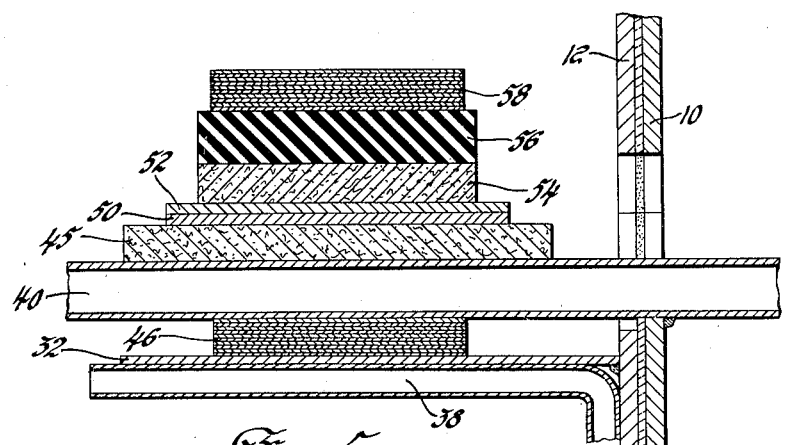
Figure 5 is an enlarged vertical longitudinal section taken on the line 5—5 of Figure 4.

Referring now more specifically to the drawings, since we are utilizing frequencies which are considerably above the ordinary power frequencies and are at the same time utilizing fairly heavy power, it is necessary to use special transformers between the source of such high frequency power and the application of the same to the work.

The transformer shown in Fig. 1 will be briefly described herein but is specifically claimed in divisional application S. N. 52,996, filed October 6, 1948, and is especially adapted to be utilized for high frequency power and it comprises in outside appearance a large ring or torus having two axially spaced circular plates in the center. The ring per se is formed of a plurality of windings 2 forming the primary circuit of the transformer, which windings are formed into a ring. A circular insulating means 4 entirely covers this ring and insulates it from the so-called secondary winding which in this case is composed of a series of loops 6 around the ring and circumferentially spaced around the periphery thereof, the loops not being complete and having their end flanges 8 extend parallel to each other and permanently connected to two circular flat plates 10 and 12 which are separated by an insulating layer 14.

Thus, all of the secondary loops 6 form a single turn secondary and all have one end connected to plate 10 and the other to plate 12. Thus, these two plates form the terminals of the secondary circuit. Therefore, upon current being introduced into the primary winding 2 from the oscillator or other source of high frequency current, current will be induced in the ratio of the primary turns to one and the secondary output from plates 10 and 12 will go directly to the inductors. In this manner the leads in the secondary circuit may be kept to a minimum length providing a very low value of leakage reactance and a minimum inductance loop.

Referring now to Figure 2, there is shown therein the two plates 10 and 12 of the transformer secondary, the latter having an opening 16 therein so that the inductors or "work coils" as they are referred to in this field to be used may be connected to the different plates as nearly together as possible. In Fig. 2 the front plate 12 carries a supporting block 18 to which is rigidly secured one inductor 20. This is formed of a member having a rectangular cross section whose rear portion is connected to the supporting block 18 and which projects at right angles to the plate 12. Its center section is raised and both the front and rear portions fall away to provide a central platform. A series of cooling ducts 22 and 24 are provided in this member for the application of cooling fluid when operating.

On either side of the inductor 20 are two similar inductors 26 and 28 which have their greater dimensions turned at right angles to that of the first and expose their larger dimension as an inductor surface. Their inner ends are secured to the transformer plate 10 and, as in the case of the inductor 20, their central section is raised to provide a central platform for the actual parts to be welded. They also are provided with cooling ducts 22 and 24 for circulating the cooling fluid. A member 30 is rigidly connected to the forwardly extending portion of all of these inductors to connect them together electrically and permit fluid flow therebetween.

In operation, cooling water or other fluid is introduced into the rearmost portion of the three inductors through insulated hoses or other similar devices so that water continuously circulates through them during operation. In this manner the outer surfaces thereof are maintained reasonably cool and withdraw heat from the outer surface of the work-piece so that the same will remain relatively cool.

When the transformer is energized, current will flow, depending, of course, upon the polarity, out through the inductor 20 and back into the two inductors 26 and 28 to the opposite transformer plate 10 which will create certain magnetic fields. When, therefore, two superimposed sheets of metal are laid upon the platform provided by the raised portions of the inductors 20, 26 and 28, and separated therefrom by a thin sheet of insulating material, this flow of current will create a flux which passes into the work sheets and induces therein currents flowing in the planes of said sheets. These currents which are induced in the sheets or parts that it is desired to weld together and which may be termed "work sheets," by the fields created by the inductors, flow within the physical dimensions of the sheets. Since we are assuming that in the majority of instances the parts to be welded will have much greater length and width dimensions than thickness, the major plane of the part may be considered as parallel to the plane of support of the upper surface of the inductors, and therefore the currents induced in the parts are defined as being "in plane" currents, since they lie in the major plane of the part, and do not flow from one part or sheet to the other. These "in-plane" currents will be highly concentrated at the approximate central plane of the middle inductor 20 since the flux flows vertically in the space between terminals 20 and 26 and 20 and 28.

Figure 13:
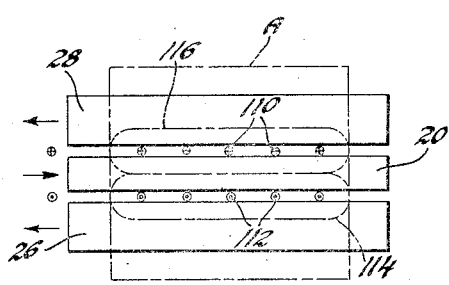
Figure 13 is a similar diagram for the inductors disclosed in Figures 2 and 3.

This is illustrated schematically in Fig. 13 of the drawings which is a top view looking down upon the three inductors. The arrows at the left of the figure illustrate the instantaneous flow of current in the inductors. The square A formed of dash lines represents the metal sheets that are to be secured together and which might be termed work sheets. When current flows through a conductor a flux is created around the same and the crosses 110 indicate such flux in the space between inductors 20 and 28 as flowing away from the observer or into the paper. On the other side in the space between inductors 20 and 26 the circle and dot indications 112 designate flux flowing upward out of the paper. This generated flux therefore flows up into the work sheets through them and down on the other side and as it does so induces currents in said sheets. These currents are shown by the dash oval figures 114 and 116. It will be noted that such current paths are double in the central part, where they support each other or add, to the strength in either of the outer surfaces. This concentrated in-plane current flow will be of sufficient intensity to cause a rise in temperature at this concentrated point sufficient to melt the metal and cause a weld between the two parts. This rise in temperature would also be likely to affect the outer surface of the lower sheet, but since the inductors themselves are maintained relatively cool by the flow of liquid therein, the heat is conducted away from this surface with sufficient rapidity to tend to prevent its becoming molten. Therefore, welds will occur in the sheets applied to the induction means shown in Fig. 2 in a central plane above the middle inductor 20.

Figure 10:
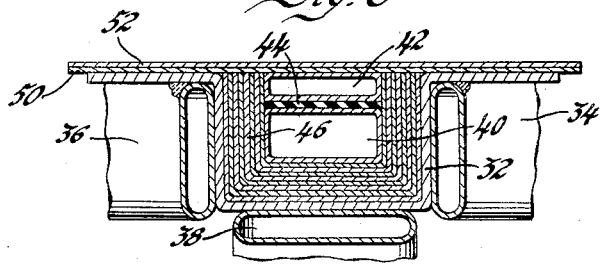
Figure 10 is an enlarged transverse sectional view taken on the line 10—10 of Figure 3.

The modification of Figures 3 and 10 of this application discloses, as before, transformer plates 10 and 12 and in this instance there is provided an angular flanged bracket member 32 rigidly secured to the front transformer plate 12 which is adapted to act as an inductor and support additional apparatus. A hollow coolant tube 34 is supported adjacent one side of the angular bracket and a second similar tube 36 is supported on the opposite side. A third tube 38 is supported beneath the lowest portion of the angle bracket for cooling that member. The central portion of the angular bracket provides a rectangular depression within which is carried the central inductor 40 which is connected to the rear transformer plate 10. The inductor 40 does not extend up to the level of the horizontal flanged portion of the bracket 32 but carries a cooling duct 42 thereon which is insulated therefrom by a layer of insulating material 44.

A series of transformer laminations 46 conforming in shape to the depression in member 32 fill the space between the central inductor 40 and the frame member 32. The upper surface of the flanged member 32 and the upper surface of the cooling duct 40 provide a platform upon which the work sheets, such as 50 and 52, may be positioned. A cross connecting member (not shown) similar in function to member 30 in Fig. 2 interconnects the outer ends of the inductors and the cooling ducts.

Figures 4 and 5 show substantially the same construction of the terminals as Figure 3 except that the cooling tube 42 supported on the center inductor 40 has been replaced by a member 45 formed of Transite. However in addition there is applied above the top sheet 52, means forming a pressure pad, since in all cases it is necessary to maintain the work securely against the inductors. This pad may consist of a block 54 formed of Transite or some similar material which is directly in contact with the upper surface of the sheet 52. Above this Transite block is a block 56 of rubber or other deformable material. In turn, enclosing the blocks and in alignment with laminations 46 are several layers of laminations 58. The purpose of the pressure pad assembly is to maintain substantially a constant pressure on the metal during its molten period so that as it tends to expand and contract, it will be maintained within spaced limits and to concentrate the magnetic field.

In this instance, when current is introduced into the transformer disks, it will flow out through one inductor momentarily, for example, the central one 40 returning through the two side flanges 32 to the opposite transformer disk and then reverse. This will create a flux which will interlink with the work sheets 50 and 52, concentrating the same substantially between the lamination piles 46 and 58. This flux will again induce "in-plane" currents in the sheets 50 and 52, which currents will be of sufficient strength to raise predetermined portions of the sheet above their melting points and weld the two together in these small concentrated areas. Here again, the cooling ducts will remove the heat from the outer surface of the sheets so that they will not be too greatly affected by the high temperatures. When the metal becomes molten, the Transite sheet 54 will protect the rubber or deformable pad 56 from the intensive heat but will allow the latter to cause surface pressure downward on the work sheet 52 and press the sheets firmly together to cause a satisfactory weld.

Figure 9:
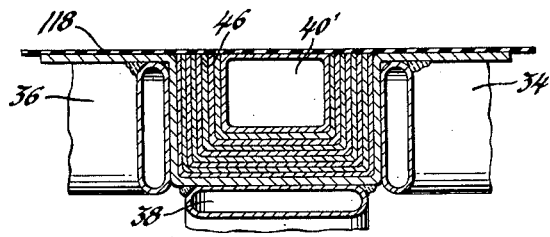
Figure 9 is a transverse sectional view of a modified form of induction means similar to Figure 3.

Figure 9 illustrates a modified form of the same general inductor construction shown in Fig. 3 except that in this case the cooling tube 42 has been entirely removed and the conductive inductor 40' moved up to a position adjacent the top of the depression in the terminal 32 and a layer of insulating material 118 placed over the inductors to prevent a short circuit. This may be used in instances where the removal of heat is not of tantamount importance. It also tends to reduce the inductance loop.

Figure 6:
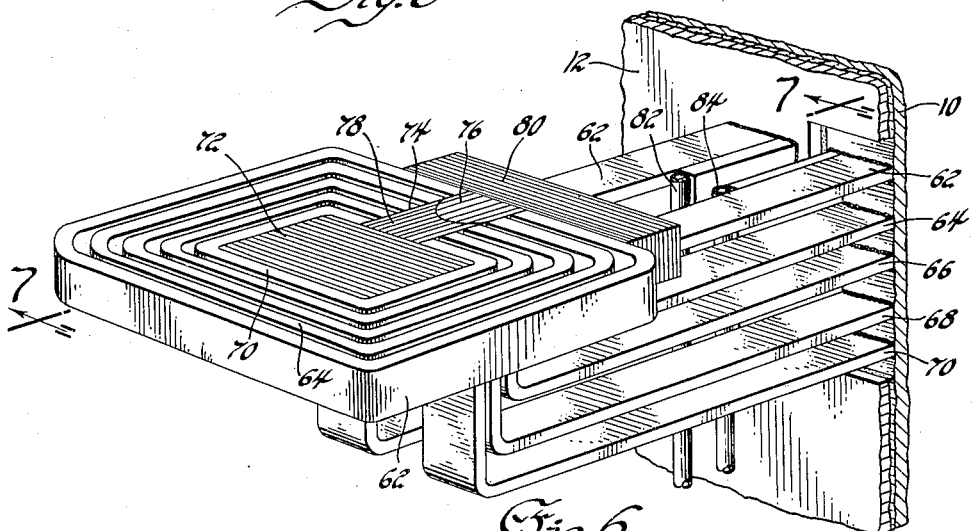
Figure 6 is a perspective view of a further modified form of induction means incorporating our invention.
Figure 7:
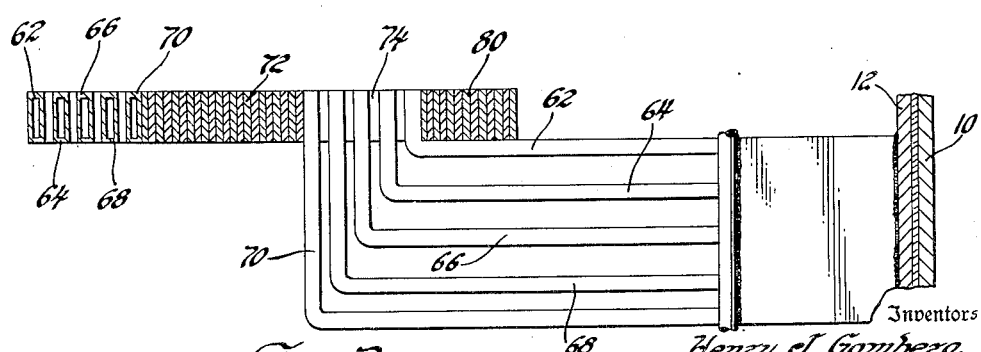
Figure 7 is a vertical section taken on the line 7—7 of Figure 6.

Referring now to the modifications shown in Figures 6 and 7, a series of hollow, roughly rectangular tubes 62, 64, 66, 68 and 70 are rigidly secured to the transformer plate 10 and projected outwardly from its surface in spaced parallel relation. The uppermost tube 62 is the shortest and is bent upwardly at right angles and then into the form of a square, being again bent downwardly at the opposite side of a spaced gap and in turn connected back to the front transformer plate 12. The second tube 64 extends slightly further than the first, is again bent upwardly at its forward portion and is also bent around into the shape of a small square to fit concentrically within the larger square formed by the tube 62 and is spaced therefrom. The remaining tubes 66, 68 and 70 are formed in like manner to the tube previously described and form progressively smaller concentric squares.

The central portion of the smallest square formed by the tube 70 is filled with laminations 72 and the gap 74 between the inner ends of the squares is occupied by two different sets of materials. A series of laminations 76 of magnetic material such as iron having a curved configuration toward the center of the gap, occupy the rear portion of this space, and a series of brass or copper laminations 78 fill the remainder. An additional set of laminations 80 are supported along the inner edge of the square. Cooling tubes 82 and 84 for introducing water or other coolant from a source are connected to the tubes 62 through 70 to introduce the cooling fluid thereto.

In this instance, the parts to be welded are laid upon the top of the square formed by the various tubes, the actual point to be welded being positioned over the narrow neck portion 74 and in alignment with the copper or brass laminations 78.

Figure 12:
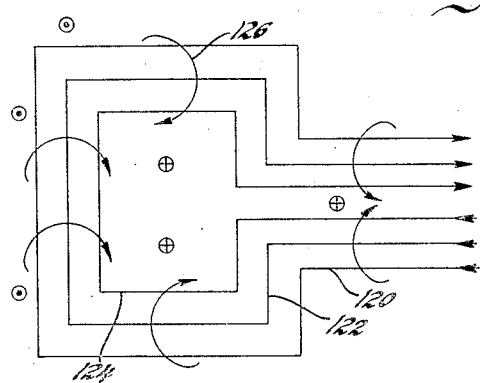
Figure 12 is a schematic diagram showing the momentary direction of current flow and flux paths for the type of inductor shown in Figures 6 and 7.

Figure 12 illustrates diagrammatically the paths of current and flux for the construction shown in Figs. 6 and 7. The instantaneous current paths are shown at 120, 122 and 124 and form parallel reactance paths with a substantially equal distribution of current. On an assumed direction of current flow as shown by the arrows the flux generated thereby will follow paths as indicated by the curved arrows 126 up into work sheets which may be supported by the tubes. This induces in-plane currents in the work sheets and it will be evident that these currents will flow across that portion above the gap 74 and be somewhat concentrated due to the high reactance of portions 72 and 80. However, since this is a relatively wide gap, it is desired to further concentrate or neck down this flow which is done by the insertion of iron laminations 76 which increases the reactance of that portion of the gaps forcing the current lines closer together over that portion above the brass laminations 78. This produces a very high "in-plane" current directly above the brass laminations and causes a weld at that point.

It might also be mentioned that the brass or copper laminations are set at right angles to the current flow to prevent shunting currents and that being good heat conductors they assist in removing heat from the outer or lower surface.

The modification disclosed in Fig. 8 is similar to those set forth in the previous instances, except that in this case terminal means are applied both above and below the sheets or parts to be welded. These sheets, in this case referred to as 86 and 88, are positioned between conductors or inductors 90, 92, 94 and 96 above and 98, 100, 102 and 104 below. The two outside conductors in each instance are secured to one transformer plate and the two inside conductors to the other transformer plate. A series of laminations 106 and 108 are likewise applied to concentrate the magnetic field. This concentration of the flux at the center of the box formed by the laminations, is sufficient to cause that portion to become molten or fluid as shown at 111. A heat resistant member 113 below and a similar one above, maintain the fluid metal in position. In this instance, the heating extends entirely through these sheets and forms a weld section similar to the contour of a rivet.

Figure 11:
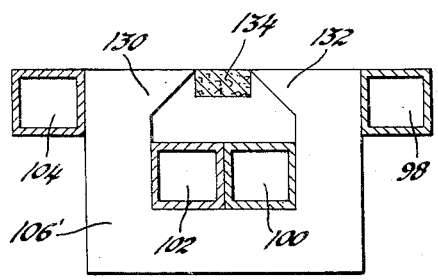
Figure 11 is a transverse sectional view through a modified form of induction means similar to that shown in Figure 8.

It will be noted in Fig. 8 that the leg portions of the laminations 106 or that portion extending to the work sheets are straight. That is, there is the same distance between the two legs at the bottom of the cavity within which the inductors 100 and 102 lie as there is at the top. Figure 11 however discloses a modified form of lamination structure in that that portion of the lamination nearest the work sheet is of greater dimension to provide a narrower air gap. In that case the terminals 98, 100, 102 and 104 are shown as before but the lamination structure 106' is provided with projecting portions 130 and 132 which extend toward each other adjacent the work sheets. This leaves a much smaller gap between the legs of the lamination. A member 134 of Transite is supported in this gap by any suitable means to back up the welding portion. This construction has the advantage of reduced leakage inductance making a lower power input necessary and still provides a space for cooling if desired.

It will thus be evident from the foregoing that we have provided means for welding with high frequency currents, members which may be applied to inductor surfaces and the heat generated by the current induced therein, preferably from one surface only.

We claim:

1. In high frequency welding means, a plurality of conductive means so shaped as to form concentric portions of a platform for work piece but spaced from each other, said platform having an opening therethrough at one point, said conductive means being adapted to be connected to a source of high frequency power, a group of magnetic laminations mounted in said opening to partially fill the same and a second group of non-magnetic laminations also mounted in the opening to fill the remainder, both groups tending to concentrate the current in and cool the surface of the work respectively.

2. In high frequency welding means, a plurality of spaced conductive members arranged to form concentric portions of a platform for a work-piece, said platform having an opening therethrough at one point, a source of power, a plurality of conductors extending from the ends of the members to the source, the lengths of said conductors being in inverse relation to the lengths of the members to which they are connected so that they form parallel reactance paths resulting in substantially equal distribution of current, a group of magnetic laminations mounted in the opening to partially fill the same, and a second group of non-magnetic laminations also mounted in the opening to fill the remainder, both groups tending to concentrate the current and cool the surface of the work respectively.

WILLIAM G. DOW.
HAROLD C. EARLY.
HENRY J. GOMBERG.

REFERENCES CITED

The following references are of record in the file of this patent:

UNITED STATES PATENTS

| Number | Name | Date |
|---|---|---|
| 1,809,468 | Bornand et al. | June 9, 1931 |
| 1,861,869 | Long | June 7, 1932 |
| 1,915,047 | Blakeslee | June 20, 1933 |
| 1,932,423 | Sessions | Oct. 31, 1933 |
| 1,997,741 | Northrup | Apr. 16, 1935 |
| 2,003,855 | Fredrickson | June 4, 1935 |
| 2,144,378 | Kennedy | Jan. 17, 1939 |
| 2,151,035 | Kennedy | Mar. 21, 1939 |
| 2,176,488 | Dreyfus | Oct. 17, 1939 |
| 2,181,899 | Kennedy | Dec. 5, 1939 |
| 2,182,341 | Hulster | Dec. 5, 1939 |
| 2,184,281 | Clark | Dec. 26, 1939 |
| 2,217,546 | Hagedorn | Oct. 8, 1940 |
| 2,318,468 | Denneen et al. | May 4, 1943 |
| 2,348,361 | Rudd et al. | May 9, 1944 |
| 2,355,560 | Roberds | Aug. 8, 1944 |
| 2,367,715 | Chapman | Jan. 23, 1945 |

FOREIGN PATENTS

| Number | Country | Date |
|---|---|---|
| 467,308 | Great Britain | June 15, 1937 |

OTHER REFERENCES

Ser. No. 387,342, Gumprecht (A. P. C.), published June 1, 1943.